Patented Sept. 21, 1948

2,449,572

UNITED STATES PATENT OFFICE 2,449,572

POLYSILOXANE RESINS

Charles E. Welsh, Schenectady, N. Y., assignor to General Electric Company, a corporation of New York No Drawing. Application August 11, 1944, Serial No. 549,135

14 Claims. (Cl. 260—46.5)

The present invention relates to polysiloxane resins, i. e., heat-hardenable organo-polysiloxanes containing more than 1.0 and less than 2, preferably from about 1.1 to 1.7 hydrocarbon radicals attached to silicon atoms. It is particularly concerned with compositions containing a polysiloxane resin as the resinous component thereof and a curing catalyst for said resin.

Polysiloxane resins of the type with which the present invention is concerned are described for example in Patents 2,258,218–222 of Eugene G. Rochow. These resins comprising a plurality of hydrocarbon-substituted silicon atoms linked by oxygen atoms are prepared for example by hydrolysis and condensation of a mixture of organo-silicon halides. The commercially useful products containing an average of more than 1.0 and less than 2 hydrocarbon radicals per silicon atom are soluble and are converted to a hard, insoluble state when heated for comparatively long periods of time at fairly elevated temperatures.

The present invention is based on the discovery that small amounts of soluble metal salts of organic acids catalyze the cure of heat-hardenable polysiloxane resins so that polysiloxane resins containing these catalysts can be cured to a solid state in a much shorter time and at lower temperatures than uncatalyzed resins. Frequently, the cured products obtained by use of a soluble metal salt of an organic acid as a catalyst have been found to be more solvent resistant than the corresponding polysiloxane compositions cured in the absence of a catalyst. The metal salt is preferably added to the liquid polysiloxane resin or resin solution just prior to the use thereof for coating, impregnating, bonding, or other application.

I have found that any metal salt of an organic acid which is soluble in the polysiloxane composition will affect the drying times of organo-polysiloxane resins. The catalytic effect appears to be independent of the organic acid radical provided the salt is soluble or can be intimately dispersed in the solvent in which the polysiloxane resin is dissolved, or in the resin itself or in the mixture of the resin and solvent. There appears to be no correlation between the curing effect of the various metals and the positions of these metals in the periodic system. Of all of the salts investigated, the salts of mercury and calcium are the least active but do exert some catalytic activity. The catalysts are effective in a wide variety of solvents including aliphatic and aromatic hydrocarbons, ethers, esters, ketones, and alcohols. In fact, no solvent has been found which appears to affect the catalytic activity of the metal salt. The relative catalytic activity of any metal salt also appears to be independent of the type of polysiloxane resin treated therewith.

While the rate of cure of the polysiloxane resins is dependent upon the amount of metal salt added to the resin, no advantage has been found in using the salts in concentrations exceeding one per cent by weight of the metal based on the weight of the resin. In general, the amount of salt employed for accelerating the curing of the polysiloxane resin will be less than one-half per cent, usually less than 0.1 per cent, by weight of metal based on the weight of the resin. For example, as little as 0.0015 per cent lead in the form of an organic acid salt has been found sufficient to cause gellation of polysiloxane resins containing in the neighborhood of from 1 to 1.5 methyl or equivalent hydrocarbon radicals per silicon atom.

The specific effect of the soluble organic acid metal salts on the cure of the polysiloxane resins is not fully understood. Although many of the salts which have been found to be effective have been used as driers in drying oil compositions, the catalytic effect of these salts on the polysiloxane resins is not believed to involve an oxidation reaction. In the first place, the polysiloxane resins are not known to contain active double bonds or other readily oxidizable groups and no drying oils or the like have been present in the polysiloxane resin compositions treated with these metal salts. Furthermore, it has also been found that oxygen is unnecessary for the cure of polysiloxane resins in the presence of the soluble organic acid salts of metals. For example, the polysiloxane resins can be cured in the presence of these metal salts in an atmosphere of nitrogen. Control samples of these same resins from which the metal salts were omitted remained liquid under the same curing conditions.

The soluble metal salts may be used alone or as mixtures of two or more salts in the practice of the present invention. To make a comprehensive study of the effect of the metal salts on the cure of the polysiloxane resins, a polysiloxane resin was prepared by hydrolysis and condensation of a mixture of 90 per cent methyl trichlorosilane and 10 per cent dimethyl dichlorosilane and the resultant resin was dissolved in equal parts by weight of a mixture of toluene and butanol. The time of gellation of samples of this resin solution in test tubes heated in a boiling water bath under reflux conditions and in the presence of known amounts of soluble metal salts indicated the catalytic effect of these salts on the cure of the resin. The catalyst was added just prior to immersion of the tube and the time was measured from the moment the test tube was immersed in the boiling water bath. The resin solution was stirred thoroughly at the beginning and intermittently throughout the determination by means of a stirring rod inserted through the reflux condenser attached to the tube. At the gel point a resin thread clung to the rod as the rod was removed from the composition. This end point was quite sharp and gel times evaluated by this method were reproducible to within 2 per cent. A series of such tests were performed using a number of metal naphthenates which were soluble in the resin solution. The results of these tests are set forth in the following table in which the weight per cent metal is based on the resin content.

| Metal | Percent Metal | Gel Time |
|---|---|---|
| Pb | 0.02 | 1 minute. |
| K | 0.02 | 2 minutes. |
| Na | 0.02 | 3 minutes. |
| Sn | 0.04 | 3 minutes. |
| Mg | 0.02 | 22 minutes. |
| Fe | 0.02 | 33 minutes. |
| V | 0.02 | 36 minutes. |
| Co | 0.02 | 50 minutes. |
| Cd | 0.04 | 52 minutes. |
| Cu | 0.02 | 62 minutes. |
| Ba | 0.02 | 62 minutes. |
| Sr | 0.04 | 79 minutes. |
| Ce | 0.02 | 93 minutes. |
| Th | 0.02 | 114 minutes. |
| Cr | 0.02 | 125 minutes. |
| Mn | 0.02 | 137 minutes. |
| Zn | 0.02 | 141 minutes. |
| Al | 0.02 | 420 minutes. |
| Ni | 0.02 | 445 minutes. |
| Ca | 0.02 | About 8 hours. |
| Hg | 0.02 | 18 hours. |

As a basis of comparison, it should be noted that the particular resin solution employed in the above tests showed no sign of gelling after being heated for 24 hours in the absence of a catalyst, all other conditions being the same. It is to be understood that the metals may be combined with acid radicals to yield salts other than the naphthenate without materially changing the curing times, provided the salts are soluble in the resinous composition. Examples of suitable acid radicals are those yielding the resinate, linoleate, stearate, oleate, or even the lower acid radicals such as those yielding the acetate, butyrate, etc., provided the resultant salts are soluble in the resinous composition.

The soluble salts of lead, tin, magnesium, and cobalt are in general the preferred catalysts as they not only have a marked catalytic activity, but also are less likely to affect the electrical properties of the cured products than are the sodium and potassium salts, for example.

Films of organo-polysiloxane resins containing fractions of a per cent of lead, tin, magnesium, and the other more effective metals in the form of their soluble organic salts have been found to cure to a tack-free state at 150 deg. C. in a few hours, whereas the uncatalyzed resins often required several days heating at the same temperature to reach the same degree of cure. The fact that polysiloxane resins cotnaining small amounts of these catalysts will cure at lower temperatures makes them particularly useful as coatings and impregnants for paper, cotton, linen, etc., sheet materials which would deteriorate at the elevated temperatures required for the cure of uncatalyzed polysiloxane resins. Tissue paper coated with a film of a catalyzed methyl polysiloxane resin and cured at 150 deg. C. looks very much like a sheet of Cellophane. Films on glass cloth of various methyl polysiloxane resins prepared by hydrolysis of a mixture of methyl silicon chlorides and silicon tetrachloride containing 0.5 per cent or less of a mixture of lead and cobalt in the form of their naphthenate salts cured to a tack-free state in from one-half to one and one-half hours at 250 deg. C. and were much thicker than control films of the same resins. The uncatalyzed resins used in making the control films were still tacky after several hours heating at 250 or 300 deg. C.

The following table shows the relative degrees of cure of catalyzed and uncatalyzed methyl polysiloxane resins as measured by the benzol solubility of cured films of the resins on glass cloth.

| Catalyst | Bake 150° C. | Resin Benzol soluble |
|---|---|---|
|  | Hours | Per cent |
| none | 4 | 24.3 |
| 0.01 Pb (naphthenate) | 2 | 11.7 |
| 0.04 Fe (naphthenate) | 1 | 10.5 |

The methyl polysiloxane resin employed in making this series of tests was prepared from a mixture of 10 parts dimethyldichlorosilane and 90 parts methyltrichlorosilane. The difference in weight of the cured samples before and after 15 minute immersion in benzol represents the benzol-soluble portion of the resin film.

Methyl prenyl polysiloxane resin are particularly fast curing in the presence of the catalysts described herein. Films of a methyl phenyl resin containing 0.02 per cent lead based on the weight of the resin became completely dry when heated at 170 deg. C. for from 10 to 20 minutes, or for 30 to 60 minutes at 150 deg. C., on a base of paper, metal, cloth, etc.

Polysiloxane resins or varnishes containing fractions of a per cent of the soluble metal salts may be used for many insulating purposes requiring a low power factor and good age-resistance. For example, the catalyzed resins may be combined with paper, glass cloth, cotton cloth or other sheet material and the resultant product employed as a condenser dielectric, wire and cable insulation, etc. The catalyzed resins in themselves may be used in the manufacture of enamelled wire without the necessity of using high baking temperatures. As varnishes for filling and treating coils, advantage can be taken of the fact that the catalysts promote the throughcuring of thick sections of the resins in the absence of air.

The catalyzed resins may also be used to advantage as bases for enamels, particularly white or light colored enamels. Methyl phenyl polysiloxanes are preferred for this application because of their faster cure, hardness, high gloss, and freedom from discoloration at elevated temperatures. For example, an enamel made by dispersing titanium dioxide in a solution of a methyl phenyl polysiloxane resin and a fraction of a per cent of lead naphthenate showed no discoloration at 150 deg. C. and only a slight yellowing at 200 deg. C. There was no loss of gloss at either temperature. The enamel had very good water resistance. Enamel pigments other than titanium oxide can of course be used.

While the invention has been described with particular reference to methyl and methyl phenyl polysiloxane resins it is to be understood that it is broadly applicable to any soluble polysiloxane resin in which the hydrocarbon radicals attached to silicon are selected from the group consisting of alkyl (e. g. methyl, ethyl, propyl, etc.), aryl (phenyl), alkaryl (tolyl), and aralkyl (phenylmethyl) radicals. Such resins may also contain two or more different radicals attached to silicon as is the case with the methyl phenyl resins described herein. All of these resins may be made into solutions in common solvents such as toluol, xylol benzene, mixtures of toluol and butanol, petroleum spirits, etc.

What I claim as new and desire to secure by Letters Patent of the United States is:

1. A composition of matter comprising a heat-hardenable hydrocarbon-polysiloxane resin containing an average of more than one and less than two hydrocarbon groups per silicon atom, and, as a curing catalyst for the said resin, a small amount of a metal salt of an organic acid soluble in said resin, the said catalyst being present in an amount sufficient to convert the said resin to a heat-hardened, tack-free state.

2. A composition of matter comprising a hydrocarbon polysiloxane resin containing an average of more than one and less than two hydrocarbon groups per silicon atom and, as a curing catalyst for said polysiloxane resin, a metal salt of organic acid soluble in said composition, said metal salt being present in an amount not substantially exceeding one per cent metal based on the weight of the said resin.

3. A composition of matter comprising a hydrocarbon-polysiloxane resin containing an average of from 1.3 to 1.7 hydrocarbon radicals per silicon atom and, as a curing catalyst for said resin, a metal salt of an organic acid, soluble in said composition, said salt being present in an amount not substantially exceeding one per cent metal based on the weight of said resin.

4. A composition of matter consisting essentially of a hydrocarbon-polysiloxane resin containing an average of more than one and less than two hydrocarbon radicals per silicon atom, a solvent, and as a curing catalyst for said resin a metal salt of an organic acid soluble in said composition, the said salt being present in an amount not substantially exceeding one per cent metal based on the weight of the said resin.

5. A composition of matter consisting essentially of a hydrocarbon-polysiloxane resin containing an average of more than one and less than two hydrocarbon radicals per silicon atom, a solvent and, as a curing catalyst for said resin, a lead salt of a mono-carboxylic acid soluble in said composition, the said lead salt being present in an amount not substantially exceeding one per cent lead based on the weight of the said resin.

6. A composition of matter consisting essentially of a hydrocarbon-polysiloxane resin containing an average of more than one and less than two hydrocarbon radicals per silicon atom, a solvent for said resin, and, as a curing catalyst for said resin, a metal naphthenate soluble in said composition, the said metal naphthenate being present in an amount corresponding to not more than one per cent metal based on the weight of the said resin.

7. A composition of matter consisting of an alkyl polysiloxane resin containing an average of from about 1.3 to about 1.7 alkyl groups per silicon atom, a solvent for said resin, and, as a curing catalyst for said resin, lead naphthenate in an amount corresponding to not more than one per cent lead based on the weight of the resin.

8. A composition of matter comprising a heat-hardenable methyl phenyl polysiloxane resin in which the average ratio of the sum of methyl and phenyl groups per silicon atom is more than one and less than two and, as a curing catalyst for said resin, a metal salt of an organic acid soluble in said composition, the said metal salt being present in an amount not substantially exceeding one per cent metal based on the weight of the said resin.

9. A composition of matter comprising an alkyl polysiloxane resin containing an average of more than one and less than two hydrocarbon groups per silicon atom and, as a curing catalyst for said polysiloxane resin, a metal salt of organic acid soluble in said composition, the said metal salt being present in an amount not substantially exceeding one per cent metal based on the weight of the said resin.

10. A composition of matter comprising a methyl phenyl polysiloxane resin in which the average ratio of the sum of methyl and phenyl groups per silicon atom is from 1.3 to 1.7 and, as a curing catalyst for said resin, a metal salt of an organic acid in an amount not substantially exceeding one per cent metal based on the weight of said resin, said salt being soluble in said composition.

11. A composition of matter consisting essentially of a methyl polysiloxane resin containing an average of more than one and less than two methyl radicals per silicon atom, a solvent and, as a curing catalyst for said resin, a metal salt of an organic acid soluble in said composition, the said metal salt being present in an amount not substantially exceeding one per cent metal based on the weight of the said resin.

12. A composition of matter consisting essentially of a methyl phenyl polysiloxane resin in which the average ratio of the sum of methyl and phenyl groups per silicon atom is more than one and less than two, a solvent and, as a curing catalyst for said resin, a lead salt of a mono-carboxylic acid soluble in said composition, the said lead salt being present in an amount not substantially exceeding one per cent lead based on the weight of the said resin.

13. A composition of matter consisting essentially of a methyl aryl polysiloxane resin in which the ratio of the sum of methyl and aryl groups to silcon is more than one and less than two, a solvent for said resin, and, as a curing catalyst for said resin, cobalt naphthenate in an amount corresponding to not more than one per cent cobalt based on the weight of the resin.

14. A composition of matter consisting of a toluene solution of methyl polysiloxane resin containing an average of from about 1.3 to 1.7 methyl groups per silicon atom, a solvent for said resin, and, as a curing catalyst for said resin, lead napthenate in an amount corresponding to not more than one per cent lead based on the weight of the resin.

CHARLES E. WELSH.

REFERENCES CITED

The following references are of record in the file of this patent:

UNITED STATES PATENTS

| Number | Name | Date |
|---|---|---|
| 2,258,218 | Rochow | Oct. 7, 1941 |

Certificate of Correction

Patent No. 2,449,572. September 21, 1948.

CHARLES E. WELSH

It is hereby certified that errors appear in the printed specification of the above numbered patent requiring correction as follows:

Column 3, line 68, for "cotnaining" read *containing*; column 4, line 34, for "prenyl polysiloxane resin" read *phenyl polysiloxane resins*; column 6, line 58, claim 14, before the numeral "1.7" insert the word *about*;

and that the said Letters Patent should be read with these corrections therein that the same may conform to the record of the case in the Patent Office.

Signed and sealed this 1st day of March, A. D. 1949.

[SEAL]

THOMAS F. MURPHY,
*Assistant Commissioner of Patents.*